United States Patent
Kadler et al.

(10) Patent No.: US 7,198,035 B2
(45) Date of Patent: Apr. 3, 2007

(54) SUPPORTING ELEMENT HAVING A SUPPORTING SURFACE FOR SUPPORTING A FUEL FEED UNIT, AND FUEL FEED UNIT

(75) Inventors: Matthias Kadler, Groβ-Gerau (DE); Klaus Markefka, Florstadt (DE)

(73) Assignee: Siemens Aktiengesellschaft, Munich (DE)

(\*) Notice: Subject to any disclaimer, the term of this patent is extended or adjusted under 35 U.S.C. 154(b) by 0 days.

(21) Appl. No.: 11/180,331

(22) Filed: Jul. 12, 2005

(65) Prior Publication Data

US 2006/0011172 A1    Jan. 19, 2006

(30) Foreign Application Priority Data

Jul. 19, 2004 (DE) .................. 10 2004 034 842

(51) Int. Cl.
*F02M 37/04* (2006.01)
*F02M 37/08* (2006.01)

(52) U.S. Cl. ................... 123/509; 210/416.4
(58) Field of Classification Search ............... 123/509, 123/514, 516; 210/258, 416.4; 417/360; 137/565.17

See application file for complete search history.

(56) References Cited

U.S. PATENT DOCUMENTS

| | | | | | |
|---|---|---|---|---|---|
| 4,862,909 | A | * | 9/1989 | Kim | 137/150 |
| 5,009,575 | A | * | 4/1991 | Hanai et al. | 417/244 |
| 5,836,554 | A | * | 11/1998 | Lesage | 248/152 |
| 6,021,988 | A | * | 2/2000 | Frank et al. | 248/346.03 |
| 6,231,318 | B1 | * | 5/2001 | Cotton et al. | 417/423.1 |
| 6,260,543 | B1 | * | 7/2001 | Chih | 123/509 |
| 6,305,417 | B1 | * | 10/2001 | Kleppner et al. | 137/565.34 |
| 6,308,691 | B1 | * | 10/2001 | Frank et al. | 123/509 |
| 6,606,980 | B1 | * | 8/2003 | Walter | 123/509 |
| 2003/0000502 | A1 | * | 1/2003 | Jones et al. | 123/509 |
| 2005/0074347 | A1 | * | 4/2005 | Ikeya | 417/423.14 |
| 2005/0155583 | A1 | * | 7/2005 | Mitsudou et al. | 123/509 |
| 2005/0217733 | A1 | * | 10/2005 | Hayakawa et al. | 137/565.17 |

\* cited by examiner

*Primary Examiner*—Mahmoud Gimie
(74) *Attorney, Agent, or Firm*—Richard A. Speer; Mayer, Brown, Rowe & Maw LLP

(57) ABSTRACT

A supporting element (9) for supporting a fuel feed unit (2) on the bottom of a fuel tank has a curved element (13) having a supporting surface (17). The curved element (13) is fastened to the lower side of the fuel feed unit (2) and is manufactured as a single piece with a coarse filter (19). Fuel sucked up through the coarse filter (19) is guided over the curved element (13), so that dirt particles are retained at a tangential edge (14) of the supporting element (9).

11 Claims, 3 Drawing Sheets

SUPPORTING ELEMENT HAVING A SUPPORTING SURFACE FOR SUPPORTING A FUEL FEED UNIT, AND FUEL FEED UNIT

BACKGROUND OF THE INVENTION

The invention relates to a supporting element having a supporting surface for supporting a fuel feed unit on the bottom of a fuel tank, having at least one protruding supporting foot which is provided with the supporting surface for resting on the bottom. The invention furthermore relates to a fuel feed unit for feeding fuel out of a fuel tank of a motor vehicle.

Fuel feed units of modern motor vehicles generally have a pump which is arranged in a surge chamber and feeds fuel out of the surge chamber. The pump can be a pump stage which is driven by an electric motor or can be a suction jet pump. Feed units in which a suction jet pump sucks fuel out of a surge chamber are frequently also referred to as intake units and, like the feed units with an electrically driven pump stage, are expressly mentioned if a component is referred to as a fuel feed unit.

Supporting elements of this type are generally manufactured as a single piece with a surge chamber of the fuel feed unit and are known in practice. The surge chamber known in practice has a multiplicity of radially extending supporting feet distributed over its circumference. By this means, the fuel feed unit is supported on the bottom of the fuel tank. The arrangement of the supporting feet forms a screen for fuel flowing from radially outside to below the surge chamber, the screen retaining coarse dirt particles. This makes it possible to take in fuel from below the surge chamber with less dirt.

Disadvantages of the known supporting element include the fact that dirt particles flowing onto it very rapidly clog up the regions between the supporting feet and become permanently stuck between the supporting feet. This may result in the fuel no longer being able to be sucked up from below the fuel feed unit. Furthermore, the shape of the supporting feet means that they produce a spot-type loading which may result in damage to the bottom of the fuel tank. In particular, manufacturing tolerances of the supporting feet or deformations of the bottom of the fuel tank result in fewer supporting feet being in contact and therefore in a high spot-type loading.

The invention is based on the problem of designing a supporting element of the type mentioned at the beginning in such a manner that the loading of the bottom of the fuel tank is kept particularly low and that an obstruction of the flow into the central region below the fuel feed unit by means of dirt particles is kept particularly low. Furthermore, the invention is based on the problem of developing a fuel feed unit for feeding fuel out of a fuel tank, in such a manner that it largely avoids a spot-type loading of the bottom of the fuel tank.

BRIEF DESCRIPTION OF THE INVENTION

This problem is solved according to the invention in that the at least one supporting foot has a curved element with an edge pointing tangentially to the fuel feed unit in the fitted state on the fuel feed unit, and in that the tangential edge is longer than the width of the curved element.

This design makes it possible for the support on the bottom of the fuel tank to take place essentially via the at least one curved element. A spot-type loading of the bottom of the fuel tank is therefore largely avoided. In addition, coarse dirt particles are retained by the tangential edge. However, dirt particles situated at the tangential edge are not able to obstruct the flow of the fuel below the fuel feed unit.

According to one advantageous development of the invention, a complicated shape for the lower side of the surge chamber of the fuel feed unit can be avoided if the supporting element has fastening means for the connection to a component of the fuel feed unit. This design makes it possible for the supporting feet to be separated from the fuel feed unit and, in addition, enables them to be manufactured from a material which loads the bottom of the fuel tank only to a very small extent.

The spot-type loading of the bottom of the fuel tank is further reduced, according to another advantageous development of the invention, if the curved element is designed as an annular element.

The spot-type loading of the bottom of the fuel tank is further reduced, according to another advantageous development of the invention, if a plurality of curved elements are distributed over the circumference of the supporting element.

According to another advantageous development, fuel sucked up from below the fuel feed unit has a particularly small amount of dirt if the curved element is arranged radially outside a coarse filter of the fuel feed unit, which filter is arranged for installation in the center of the fuel feed unit.

The installation of the coarse filter and of the supporting foot on the fuel feed unit is simplified, according to another advantageous development of the invention, if the coarse filter is manufactured as a single part with the curved element.

The supporting element according to the invention can be manufactured particularly cost-effectively if the fastening means, the coarse filter and the curved element are manufactured as a single piece from plastic by injection molding.

The supporting element according to the invention has particularly high stability if at least one radially oriented web is guided radially inward from the curved element.

The supporting surface could be arranged exclusively on the curved element. The supporting surface is increased, according to another advantageous development of the invention, if the supporting surface is arranged on the curved element and the radially inwardly guided webs. This further reduces the loading of the bottom of the fuel tank.

The introduction of dirt into the region below the fuel feed unit is further reduced, according to another advantageous development of the invention, if at least one duct for guiding fuel into a central region below the fuel feed unit is guided over the curved element and/or is guided between two curved elements. With the duct guided over the curved element, the curved element, in the fitted state, forms a sill bearing against the bottom of the fuel tank. Fuel flowing in under the fuel feed unit has to overcome the sill, with the result that dirt particles situated at the bottom of the fuel tank are reliably retained.

According to another advantageous development of the invention, dirt particles in a flow of fuel between two curved elements can be largely retained if a plurality of curved elements overlap one another in the tangential direction, so that tangential edges of adjacent curved elements lie opposite one another. By means of this design, the curved elements form a labyrinth which retains dirt particles.

The fuel feed unit is capable of reliably sucking up fuel from the fuel tank as soon as the fuel level is at least level with the curved element if the upper edge of the curved element is arranged level with the lower edge of the coarse filter, and if the radially oriented webs radially space the curved element from the coarse filter.

The problem mentioned second, namely the provision of a fuel feed unit which largely avoids a spot-type loading of the bottom of the fuel tank, is solved according to the invention by fastening means for the connection to a supporting element.

This enables direct contact of the lower side of the fuel feed unit with the bottom of the fuel tank to be avoided. It is therefore not possible for forces to be introduced directly by the fuel feed unit into the bottom of the fuel tank.

According to another advantageous development of the invention, a pre-filtering of the fuel flowing in under the fuel feed unit can be achieved in a simple manner if individual projections which are arranged on the lower side of the fuel feed unit and form a labyrinth rest on the curved element of the supporting element.

BRIEF DESCRIPTION OF THE DRAWINGS

The invention permits numerous embodiments. To further clarify its basic principle, a number of these are illustrated in the drawing and are described below. In the drawing

DETAILED DESCRIPTION OF THE INVENTION

Figure 1:
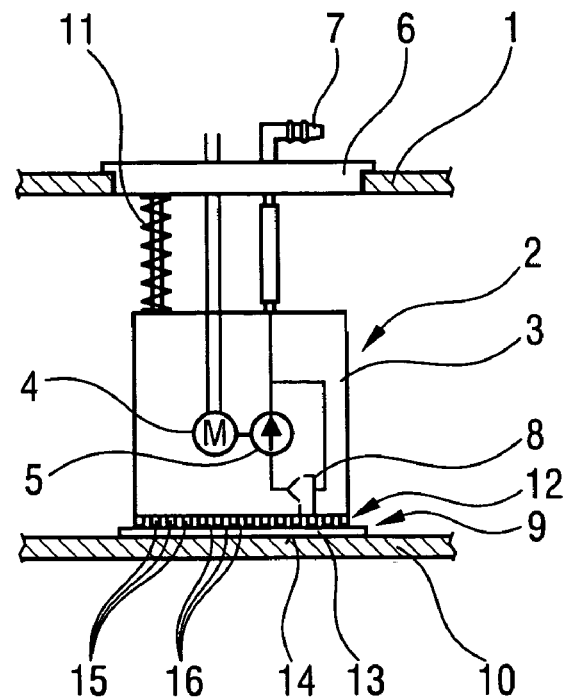
FIG. 1 shows a fuel feed unit which is fitted in a fuel tank of a motor vehicle and has a supporting element.

FIG. 1 schematically shows a fuel feed unit 2 arranged in a fuel tank 1. The fuel feed unit 2 has a pump stage 5 which is arranged in a surge chamber 3 and is driven by an electric motor 4. The pump stage 5 feeds fuel out of the surge chamber 3 to a connecting branch 7 arranged on a closure cover 6. A forward flow line (not illustrated) leading to an internal combustion engine can be connected to the connecting branch 7. Furthermore, the pump stage 5 feeds fuel to a suction jet pump 8 arranged in the bottom region of the surge chamber 3. The suction jet pump 8 sucks up fuel from the lower side of the surge chamber 3. The fuel feed unit 2 is supported with a supporting element 9 on the bottom 10 of the fuel tank 1. A spring element 11 prestresses the fuel feed unit 2 in the direction of the bottom 10. The supporting element 9 has a supporting foot 12 with a curved element 13 designed as an annular element. The curved element 13 therefore has an encircling edge 14 which is longer than the width of the curved element 13, which width rests on the bottom 10 of the fuel tank. On the side facing the supporting element 9, the surge chamber 3 of the fuel feed unit 2 has a plurality of projections 15 which are arranged in the manner of a labyrinth and which rest on the curved element 13. Between the projections 15 arranged in the manner of a labyrinth, a duct 16 is formed, through which fuel flows from outside the fuel feed unit 2 to below the fuel feed unit 2. Fuel sucked up by the suction jet pump 8 is therefore first of all guided over the curved element 13 designed as an annular element, with the result that dirt particles can be retained at that edge 14 of the supporting element 9 which rests on the bottom 10. The fuel subsequently flows through the duct 16 formed by the projections 15 of the surge chamber 3, which projections are in the manner of a labyrinth, at which point further dirt particles are retained.

Figure 2:
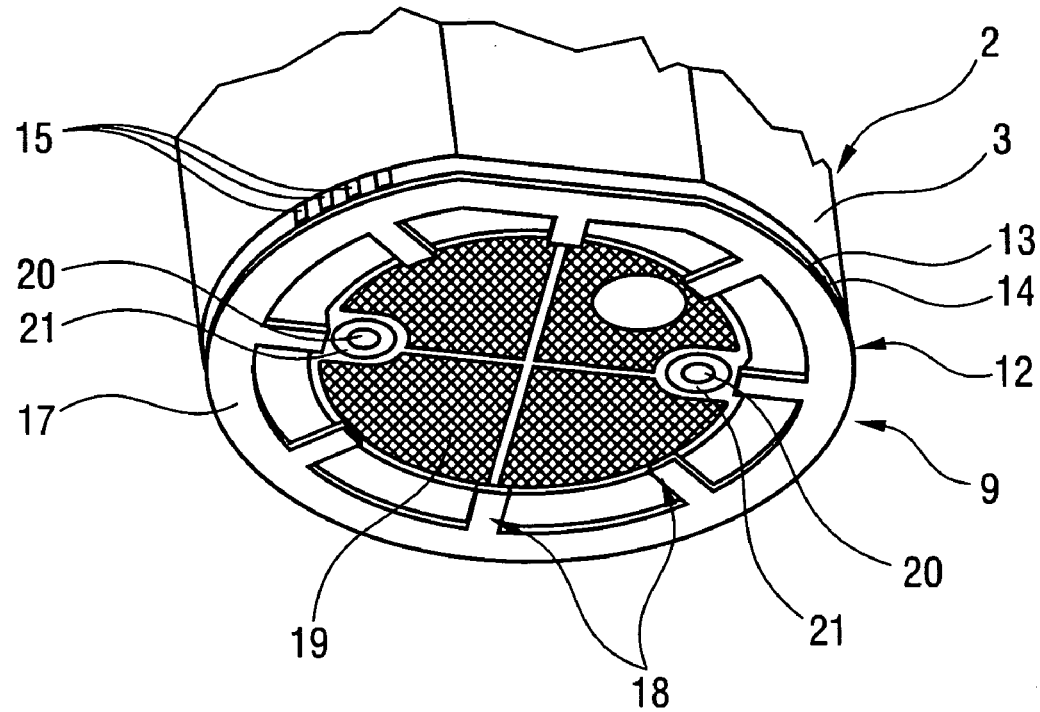
FIG. 2 shows a perspective illustration from below of the fuel feed unit from FIG. 1 with a first embodiment of the supporting element.

On the lower side, the curved element 13 has a supporting surface 17 for bearing against the bottom 10 of the fuel tank 1. This supporting surface 17 can be seen in FIG. 2 in a perspective illustration from below and therefore, as seen from the side of the bottom 10 of the fuel tank 1, of the fuel feed unit 2 with the supporting element 9. FIG. 2 furthermore shows that a plurality of webs 18 are guided radially inward from the curved element 13 to a coarse filter 19. Fastening means 20 designed as fastening recesses and intended for fastening the surge chamber 3 by means of latching elements 21 are arranged in the coarse filter 19. The coarse filter 19, the webs 18 and the curved element 13 are manufactured as a single piece from plastic by injection molding. The coarse filter 19 is formed by a lattice and is arranged directly in front of the suction side of the suction jet pump 8. The supporting surface 17 with which the fuel feed unit 2 is supported on the bottom 10 of the fuel tank I extends from the curved element 13 over the radial webs 18. In a departure from the exemplary embodiment illustrated, the fuel feed unit may also be designed as an "intake unit" without a pump stage driven by an electric motor. In the case of intake units of this type, a suction jet pump generally feeds fuel out of the surge chamber 3.

Figure 3:
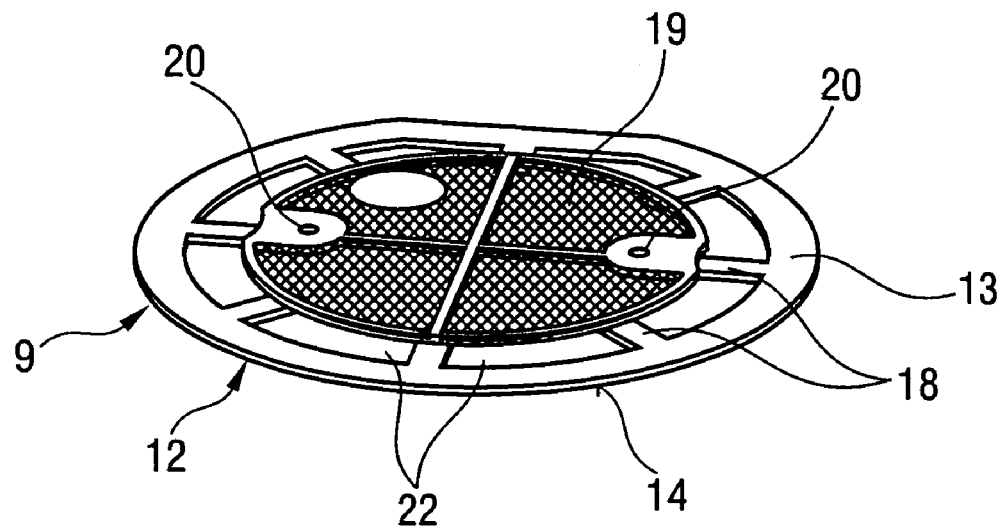
FIG. 3 shows a view from above of the supporting element from FIG. 1, FIG. 4–FIG. 6 each show a further embodiment of the supporting element from FIG. 1 in a view from below.

FIG. 3 shows the supporting element 9 perspectively from above.and therefore from the side of the surge chamber 3 illustrated in FIG. 1. It can be seen here that the lower side of the coarse filter 19 rests on the upper side of the radially guided webs 18. The webs 18 space the curved element 13 from the coarse filter 19 in the radial direction, as a result of which, a vertical duct 22 is formed between the curved element 13 and the coarse filter 19, through which duct the fuel can flow in from the coarse filter between the projections 15, which are illustrated in FIG. 1 and are arranged in the manner of a labyrinth, to under the fuel feed unit 2.

Figure 4:
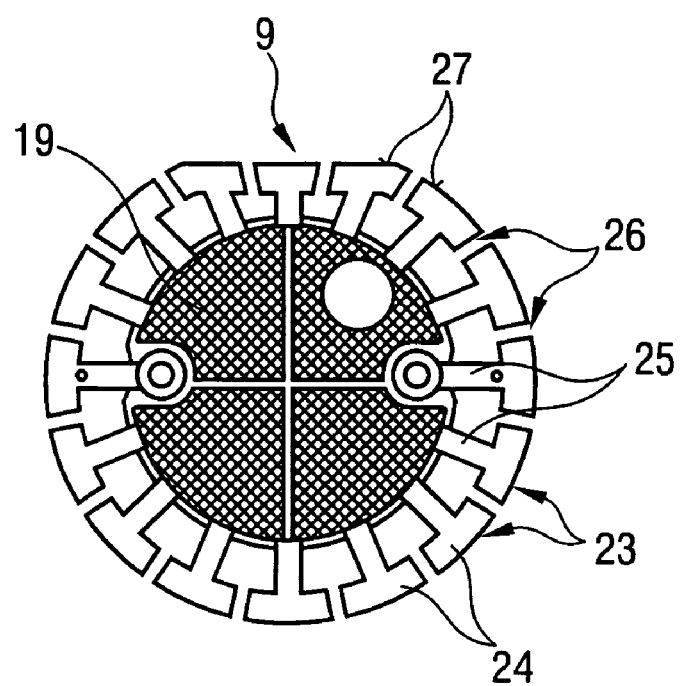

FIG. 4 shows a further embodiment of the supporting element 9 from FIG. 1 in a view from below. This embodiment differs from that from FIGS. 2 and 3 by the fact that a plurality of individual supporting feet 23 are connected by a respective curved element 24 via radially guided webs 25 to the coarse filter 19 arranged in the center. The supporting feet 23 therefore likewise bound a duct 26 through which fuel can flow to the coarse filter 19. The curved elements 24 each have a tangential edge 27 which is larger than the width of the curved elements 24.

Figure 5:
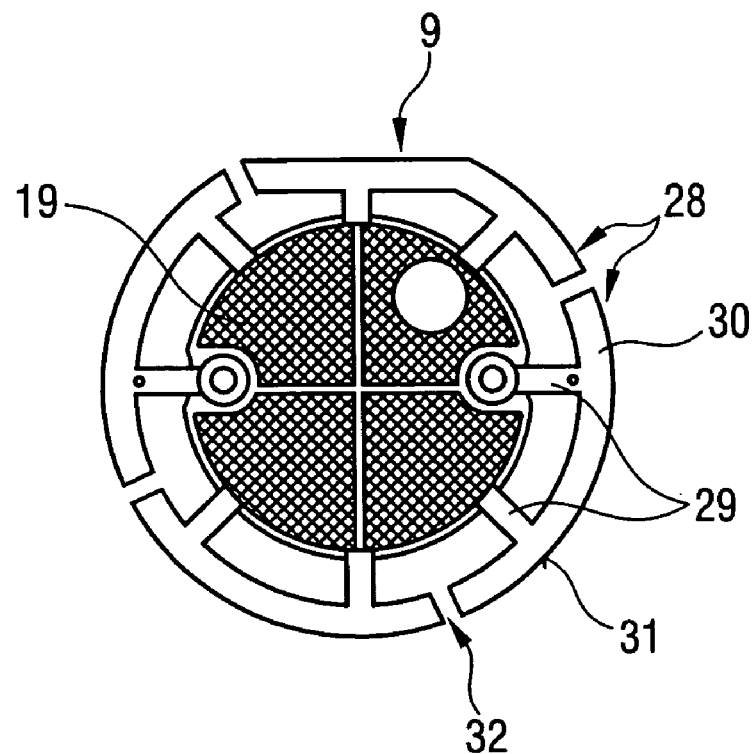

FIG. 5 shows a further embodiment of the supporting element 9 from FIG. 1, in which a plurality of supporting feet 28 each have a curved element 30 which is held by two radially guided webs 29 and has a tangential edge 31 which is longer than the width of the curved elements 30. A duct 32 for guiding the fuel to the coarse filter 19 is also arranged here between the supporting feet 28.

Figure 6:
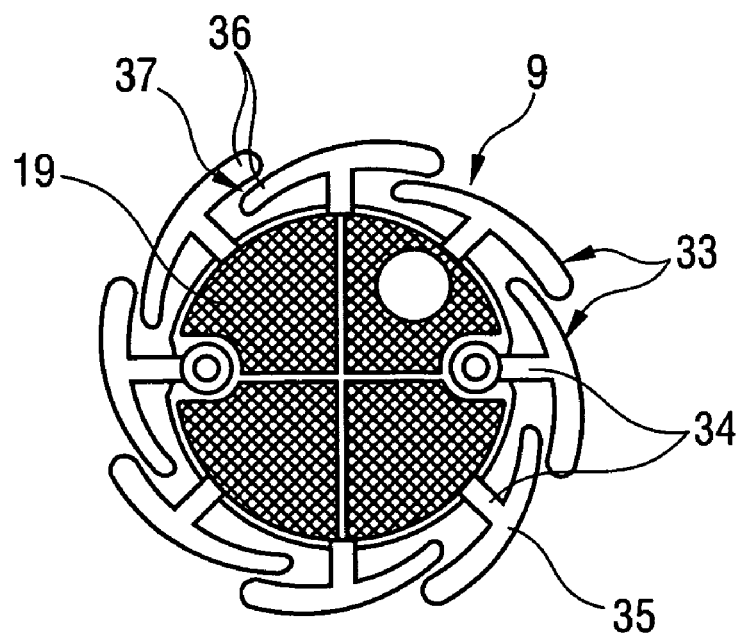

FIG. 6 shows a further embodiment of the supporting element 9, in which a plurality of supporting feet 33 each have a radially guided web 34 and a curved element 35. The curved elements 35 of mutually adjacent supporting feet 33 overlap one another in the tangential direction, so that their tangential edges 36 lie opposite one another. The supporting feet 33 therefore form a duct 37 which is in the manner of a labyrinth and through which fuel can flow to the coarse filter 19.

The invention claimed is:

1. Structure for a multi-stage filtering and supporting element for a surge tank within an automotive fuel tank, the structure comprising:
   (a) a curved element having upper and lower surfaces for contact with the surge tank and with the bottom wall of the fuel tank, respectively and having a vertical edge connecting the upper and lower surfaces,
   (b) means to define paths for fuel flow over the edge of the curved element in a direction from the fuel tank toward the interior of the surge tank, whereby the fuel is filtered first by the edge to remove particulate material therefrom and;
   (c) a coarse second filter located within and supported by the curved element at a location spaced above the fuel tank floor to effect a second filtering of the fuel as it passes into the surge tank.

2. The supporting element as claimed in claim 1, characterized in that the supporting element (9) has fastening means (20) for the connection to a component of the fuel feed unit (2).

3. The supporting element as claimed in claim 1 or 2, characterized in that the curved element (13) is designed as an annular element.

4. The supporting element as defined in claim 1, wherein the supporting element (9) is comprised of a plurality of curved elements (24, 30, 35).

5. The supporting element as defined in claim 1, wherein the curved element (13, 24, 30, 35) is arranged radially outside a coarse filter (19) of the fuel feed unit (2), which filter is arranged for installation in the center of the fuel feed unit (2).

6. The supporting element as defined in claim 5, wherein the coarse filter (19) is manufactured as a single part with the curved element (13, 24, 30, 35).

7. The supporting element as defined in claim 6, wherein fastening means (20), coarse filter (19) and curved element (13, 24, 30, 35) are manufactured as a single piece from plastic by injection molding.

8. The supporting element as defined in claim 1, wherein at least one radially oriented web (18, 25, 29, 34) extends radially inwardly from the curved element (13, 24, 30, 35).

9. The supporting element as defined in claim 8, wherein the supporting surface (17) is arranged on the curved element (13, 24, 30, 35) and the radially inwardly guided webs (18, 25, 29, 34).

10. The supporting element as defined in claim 1, wherein the curved element (13,24,30,35) forms at least one duct (16, 22, 26, 32, 37) for guiding fuel into a central region below the fuel feed unit (2).

11. The supporting element as defined in claim 1, wherein a plurality of curved elements (35) overlap one another in the tangential direction, so that tangential edges (36) of adjacent curved elements (35) lie opposite one another.

* * * * *